United States Patent [19]

Tonomura

[11] Patent Number: 5,214,526
[45] Date of Patent: May 25, 1993

[54] PULSE MODULATED INFRARED DATA COMMUNICATIONS LINK

[75] Inventor: Kihachiro Tonomura, Yamato, Japan
[73] Assignee: Apple Computer, Inc., Cupertino, Calif.
[21] Appl. No.: 709,749
[22] Filed: Jun. 4, 1991
[51] Int. Cl.$^5$ .................... H04B 10/04; H04B 10/00
[52] U.S. Cl. .................... 359/184; 359/154; 359/181; 375/55; 341/70; 332/112
[58] Field of Search ............ 359/154, 142, 181, 182, 359/184–186, 118; 375/55, 87, 37; 332/100, 108, 112, 119; 341/70–71; 360/44

[56] References Cited

U.S. PATENT DOCUMENTS

| | | | |
|---|---|---|---|
| 3,836,726 | 9/1974 | Wells et al. | 379/57 |
| 3,899,429 | 8/1975 | Ueno et al. | 359/154 |
| 3,905,029 | 9/1975 | McIntosh | 360/44 |
| 4,361,817 | 11/1982 | Stillwell | 375/55 |
| 4,573,169 | 2/1986 | van Gerwen et al. | 375/55 |
| 5,081,711 | 1/1992 | Dickman, Jr. | 359/184 |

Primary Examiner—Edward L. Coles, Sr.
Assistant Examiner—Kinfe-Michael Negash
Attorney, Agent, or Firm—Mark Aaker

[57] ABSTRACT

A pulse modulated infrared data communications link including a transmitter and receiver in which the data to be sent is encoded as a biphase modulated signal having bit-cell and mid-cell transitions. Each transition is encoded as a narrow pulse in a pulse modulated signal. The pulse modulated signal is used to activate an infrared optical transmitter for generating pulsed optical signals. At a receiver, an optical detector converts pulsed optical signals into pulsed electrical signals. The pulsed electrical signals are amplified and filtered and evaluated by a comparator to generate a pulsed digital signal. The pulsed digital signal is processed by a logic circuit to generate a biphase encoded signal for transmitting on a serial data line.

1 Claim, 2 Drawing Sheets

PULSE MODULATED INFRARED DATA COMMUNICATIONS LINK

BACKGROUND OF THE INVENTION

This invention relates to the transfer of digital data between a transmitter and receiver by the pulse modulation of an infrared signal.

It is known to use infrared signals to perform "wireless" remote control. One common example is an infrared wireless remote control for a television set.

In the field of computers it is common to link computers together by a local area network (LAN) for the transfer of data between the computers. Where there are both fixed, desktop computers and and movable, portable computers, it is desirable to connect the portable computers to a LAN without a physical wire connection. A "wireless" infrared signal can be used to perform this connection of a portable computer to a LAN, if the infrared signal is appropriately modulated and transmitted by a transmitter, and detected and decoded by a receiver.

SUMMARY OF THE INVENTION

This invention provides a pulse modulated infrared data communications link including a transmitter and receiver which can be used, for example, to connect a portable computer to a LAN.

The data to be sent is encoded as a biphase modulated signal having bit-cell and mid-cell transitions. Each transition is encoded as a narrow pulse in a pulse modulated signal. The pulse modulated signal is used to activate an infrared optical transmitter for generating pulsed optical signals.

At a receiver, an optical detector converts pulsed optical signals into pulsed electrical signals. The pulsed electrical signals are amplified and filtered and evaluated by a comparator to generate a pulsed digital signal. The pulsed digital signal is processed by a logic circuit to generate a biphase encoded signal for transmitting on a serial data line.

The use of a pulse modulated infrared signal provides many significant advantages. First, there is a high noise immunity, and noise from other light sources such as fluorescent lamps can be filtered out without greatly degrading the desired signal. Pulse modulation also uses the infrared emitter very efficiently, since the signal is short, high power, bursts of light rather than a low power, continuous signal.

DETAILED DESCRIPTION

Figure 1:
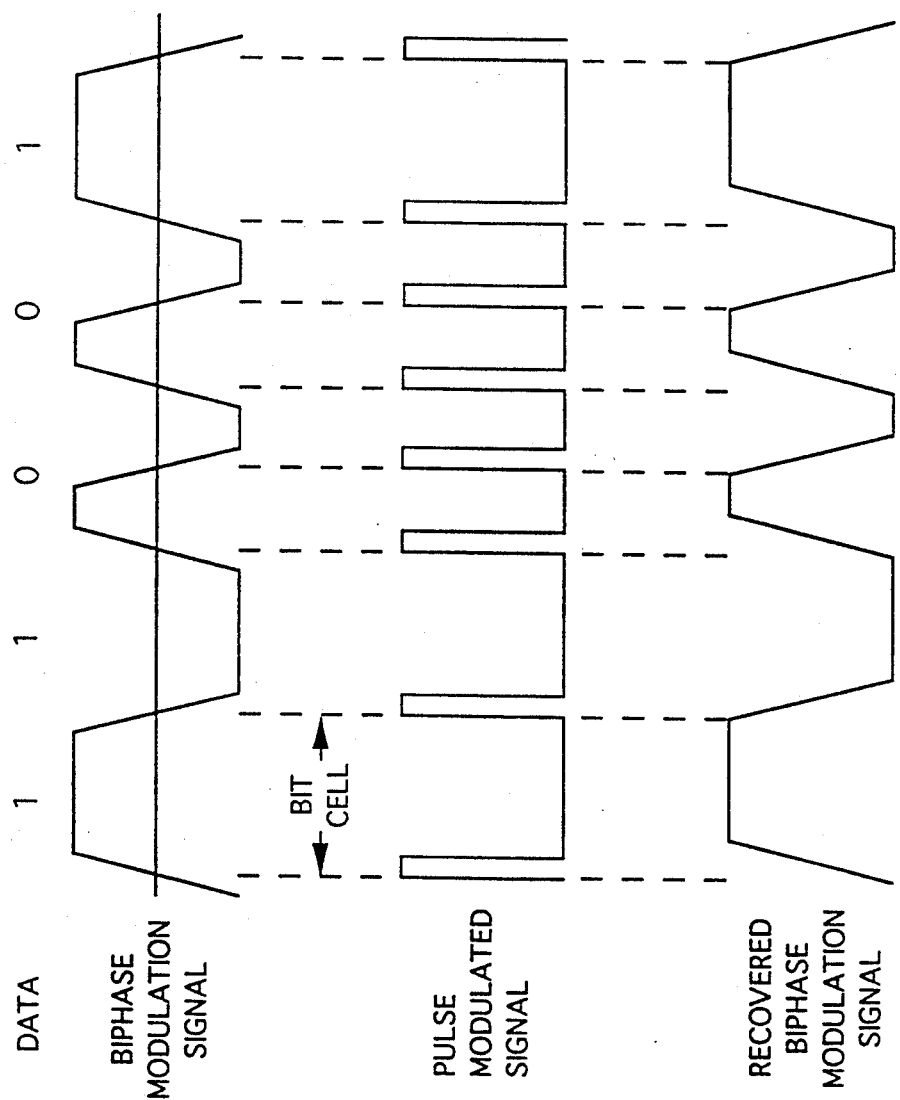
FIG. 1 illustrates a timing diagram illustrating the invention's use of biphase frequency modulation and pulse modulation.

FIG. 1 illustrates a timing diagram illustrating the invention's use of biphase frequency modulation and pulse modulation. The top waveform shows digital data encoded as a biphase space (FM-0) encoded signal. In FM-0, a zero voltage crossing transition occurs at the end of every fixed period of time, known as a "bit-cell," thereby providing necessary timing information to the receiver. A logical one is encoded in a particular bit-cell by a zero-crossing transition only at the end of the cell. A logical zero is encoded by adding an additional transition at mid-cell, such that two zero crossings are detected for each bit-cell encoding a zero. Accordingly, through the use of FM-0 encoding, clocking information is carried by the signal itself, and permits the present invention to operate in a synchronous or self-timing mode.

In a preferred implementation for a LocalTalk (Trademark of Apple Computer, Inc.) data communications network, the data rate is 230.4 Kbps and each cell is typically 4.34 microseconds in duration.

In this invention, the FM-0 signal is now encoded as a pulse modulated signal. Each zero voltage crossing which corresponds to a transition is sent as a narrow pulse signal. Therefore, a chain of zero crossings is encoded as a chain of narrow pulses, one pulse at each zero voltage crossing point. These pulses must be narrower than one-half of the duration of a bit-cell, so that pulses do not overlap and merge, for example in cells having both a mid-cell and end-cell zero voltage crossing. Preferably the pulses are of shorter duration than one-quarter of a bit-cell. The minimum pulse width is limited by the pulse response characteristics of the transmitting and receiving components. In a preferred implementation, a pulse width of approximately 100 nanoseconds is used.

Further in this invention, the pulse modulated signal is used to drive an infrared emitter, such as an infrared LED (light-emitting diode). In a preferred embodiment, the emitted wave length is approximately 850 nanometers. The pulse modulation method allows much higher LED peak output power then would direct modulation of the LED with the FM-0 signal.

Further in this invention, at a receiver, an infrared sensitive photodetector receives the pulsed infrared signal. After amplification and filtering, the pulsed electrical signal is converted by digital logic to an biphase modulation encoded signal. The recovery of the biphase modulation signal is done by charging the state of the output signal at each transition from low to high in the received pulsed signal.

Figure 2:
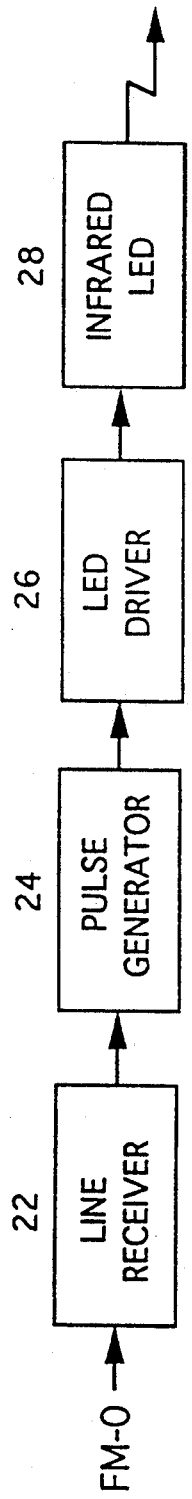
FIG. 2 is a block diagram of a transmitter in accordance with the invention.

FIG. 2 is a block diagram of a transmitter in accordance with the invention. The transmitter circuit consists of a Line Receiver 22 which receives the FM-0 encoded digital data signal. In a preferred implementation, the Line Receiver converts an RS-422 signal to TTL levels. The FM-0 signal is then applied to a Pulse Generator 24. The Pulse Generator 24 generates a pulse corresponding to each zero voltage crossing point in the FM-0 signal. The Pulse Generator 24 can include an edge detect circuit to detect the edges or transistions of the FM-0 signal and to trigger a pulse generation circuit. The pulse modulated signal is then applied to an LED Driver 26 which amplifies the signals and converts them to appropriate voltage and current levels for activating an Infrared LED 28. At a pulse width of 100 nanoseconds, a relatively high output current of approximately 300 milliamperes for driving the LED 28 can be achieved, without exceeding the average power dissipation limits of the LED 28. The LED 28 has a very fast response time, typically 10 nanoseconds, so that it can adequately reproduce the pulse, and yet is operating at a low duty cycle.

Figure 3:
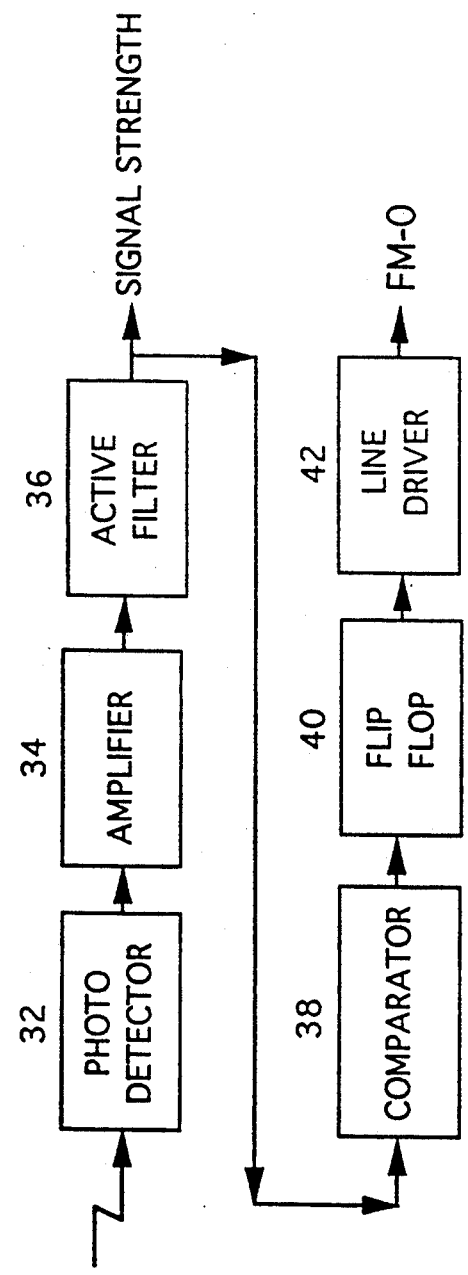
FIG. 3 is a block diagram of a receiver in accordance with the invention.

FIG. 3 is a block diagram of a receiver in accordance with the invention. A Photo Detector 32 receives the Infrared pulses. In a preferred embodiment, a PIN diode is used as a photo detector for sensing infrared modulated beam. The PIN diode is biased to an operating point to obtain a fast response time. The resulting pulsed electrical signal is then amplified in an Amplifier 34, and filtered in an Active Filter 36. In a preferred embodiment, the Amplifier 34 is a FET input op-amp and the Active Filter 36 rejects unnecessary signals of less than 100 KHz. The pulsed signal at the output of Active Filter 36 is applied to a Comparator 38 to generate a pulsed digital logic signal, preferably of a TTL signal level.

The pulsed signal at the output of Active Filter 36 can also be detected to serve as an indication that pulsed optical signals are being received, and the relative strength of the signals. This signal strength indication can be used to help align the transmitter and receiver for better signal reception.

The pulsed digital logic signal is applied to a Flip-Flop circuit 40 for encoding the pulsed digital logic signal into a biphase modulation encoded signal. This biphase modulation signal is output on a serial data line by a Line Driver circuit 42.

As an example, an infrared transmitter and receiver in accordance with this invention can be used to connect a portable computer to a LAN, without the need for a physical wire connection. An infrared trasmitter and receiver are installed in the portable computer, and an infrared transmitter and receiver are installed in a unit attached to the LAN. The communications link from the portable computer to the LAN is operated on a different frequency than the opposite link, or they can be separated in time, modulation, or encoding. Using commonly available components such as infrared LEDs and PIN diode photodetectors, reliable communication has been possible over a distance of 6 meters, which is suitable for use in the standard office.

These and other embodiments and implementations will be apparent to a person skilled in the art from a consideration of the specification, drawings, and claims. It is intended that the scope of the invention be limited only by the scope of the following claims.

What is claimed is:

1. A method for communicating a biphase modulated signal having bit-cell and mid-cell transitions across an optical data link comprising:

receiving said biphase modulated signal at a line receiver on a serial data line;

encoding each bit-cell and mid-cell transition of said biphase modulated signal to a narrow unidirectional pulse of a pulse modulated signal;

driving an optical transmitter with said pulse modulated signal to produce a pulsed optical signal;

receiving said pulsed optical signal at an optical receiver;

converting said received optical pulses to a pulsed electrical signal;

decoding said pulsed electrical signal as a biphase modulated signal; and sending said biphase modulated signal on a serial data line by a line driver.

* * * * *